July 27, 1965

R. S. INGLEY 3,196,731

SOLFA STAIRWAY

Filed July 22, 1963

INVENTOR.
RAE S. INGLEY
BY
*Jack H. Linscott*
ATTORNEY

INVENTOR.
RAE S. INGLEY
BY
*Jack H. Linscott*
ATTORNEY

United States Patent Office 3,196,731
Patented July 27, 1965

3,196,731
SOLFA STAIRWAY
Rae S. Ingley, 754 Old Lundy Road, Macon, Ga.
Filed July 22, 1963, Ser. No. 296,790
1 Claim. (Cl. 84—476)

My invention relates to a device for use in the teaching some of the fundamentals of music, more particularly, for use in the teaching of the fundamentals of music to blind pupils. The use of the device, however, is not limited to the teaching of the blind, as it can also be used with equally good results in the teaching of music to the sighted pupil. It finds its more important use in the teaching of the blind, because it fills a need in this instance, that is not particularly present when the pupils can see.

The invention has its origin in the teaching of the blind pupils in the elementary and secondary grades. The aids that are available to the teacher of the sighted pupils are not available to the teacher of the unsighted pupils. For example the teacher of the sighted pupils has music books that can be placed in the hands of the pupils. The teacher also has the blackboard upon which the staff and scale can be represented. Also, indication of melodic direction can be given by the wave of the hand, or the nod of the head and through other gestures. These things are not available to the teacher of the unsighted.

Even though music books printed in braille may be placed in the hands of the unsighted, they do not supply all the needs in the teaching of the blind. It would perhaps produce other complications if these braille books were put in the hand of the young pupil because they use symbols to represent the same thing in a different way, as for example, in music notation the letter "D" is used to represent the pitch of "C," the letter "E" the pitch of "D," the letter "F" the pitch of "E" etc. To introduce the pupils to this music notation before they have learned the literary braille would complicate their learning of the braille.

The music notation in braille form also does not provide for the musical or melodic direction that is present in the printed staff, since all the symbols are printed on a horizontal line across the sheet or the page, and this gives no direction.

The use of literary braille symbols can however be used to provide the unsighted pupil with experience in reading as they sing. The use of literary braille symbols in conjunction with a means to provide the indication of melodic direction by gesture and a sense of spacing of the tones or notes relative to each other would provide the teacher of the unsighted with a means that can be used as a substitute for the printed staff, the blackboard and the direction by gestures.

The present invention provides a plurality of steps or levels arranged vertically at a distance apart proportional to the musical interval between the tones or notes of the musical scale. So arranged, each level is given a symbol for example the first letter of the "Do, Re, Mi, Fa" word symbols of the notes, and are thus identified relative to each other in position as for example up or down the stairway. Also, the levels or steps are spaced in proportion to the musical scale interval or differences in pitch between the notes represented or identified with the levels. As disclosed, the invention takes the form of a stairway having steps representing different levels of tone and the risers of which are proportioned to represent the musical intervals between the tones. As the sighted pupil follows with his eyes the notes on the printed staff as he sings the scales and simple songs, the blind pupil can follow through his sense of touch the ups and downs of the scale and learn through the touch as well as through his sense of hearing the spacing of the notes, the direction and their relative position.

It is an object of the present invention to provide a teaching aid for the teaching of the fundamentals of music.

Another object of the invention is to provide a teaching aid for the teaching of the fundamentals of music to the blind.

Still another object of the invention is to provide a teaching aid for the teaching of the major and chromatic music scales, the various intervals between the notes thereof and to give melodic direction.

Other objects of the invention will appear as the disclosure proceeds in the specification, claim and the appended drawing in which:

Figures 1, 2:
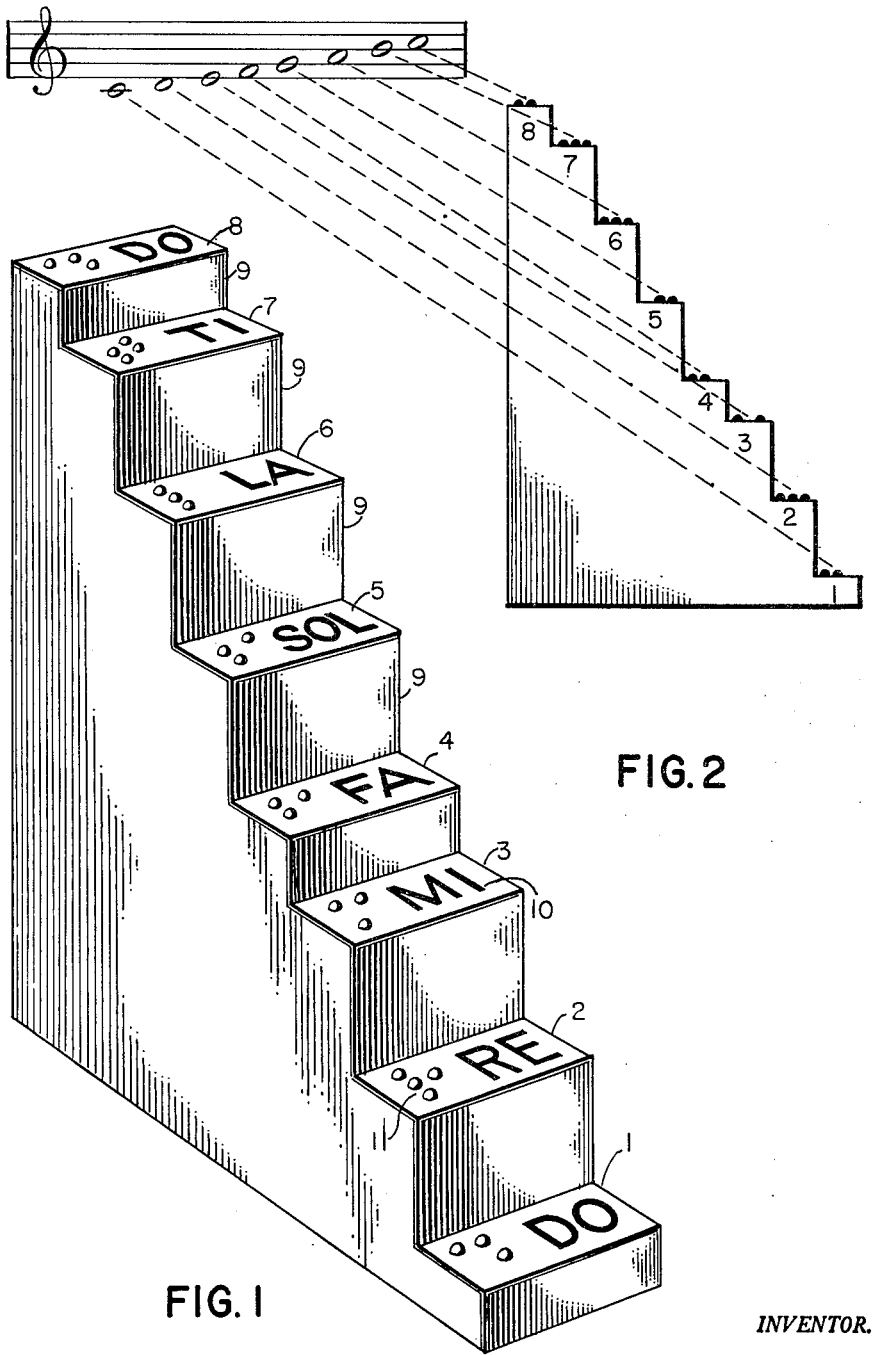
FIGURE 1 is a view in perspective of one embodiment of the invention.
FIGURE 2 is a side elevational view of the stairway shown in FIGURE 1, wherein the various levels or steps are related to the notes on the printed staff.

Referring to FIGURES 1 and 2 of the drawing, the "Solfa Stairway" is made from wood, plastic or any solid material that will retain its shape and resist breakage from rough handling.

It is formed into the shape of a stairway having steps 1 to 8 inclusive and risers 9 connecting each of the adjacent steps. Upon each of the steps is printed the word symbols 10 of the notes or tones of the major musical scale. This printing in visual form adapts the device for use in teaching of the sighted or partially sighted pupils. Beside the visual printed word symbols each step also has printed thereon in braille the first letter of each of the word symbols, whereby the unsighted pupil may identify the step with a definite note or tone of the musical scale. As illustrated in FIGURE 2, the steps 1 to 8 inclusive represent the major scale, with the step "Do," step 1 being related to the key of "C" on the printed staff. Steps 2 to 8 inclusive or "Re," "Mi," "Fa," "Sol," "La," "Ti" and "Do" are also related to the keys of D, E, F, G, A, B, and C respectively.

The risers 9 between the steps 1 and 2, 2 and 3, 4 and 5, 5 and 6, and 6 and 7 are proportioned in the vertical direction to represent full steps that exist between the tones or notes Do and Re, Re and Mi, Fa and Sol, Sol and La, and La and Ti. The risers between the steps 3 and 4 and between steps 7 and 8 are made with one half the distance in the vertical direction of the other steps to represent the half step interval between the tones or notes Mi and Fa and between the tones or notes Ti and Do respectively. This arrangement has the advantage over the printed scale, in that the full and half steps between the tones or notes of the scale are indicated. In the printed scale the notes are all spaced the same distance. From this form of representation of the major scale the full and half steps are clearly evident.

Figures 3, 4:
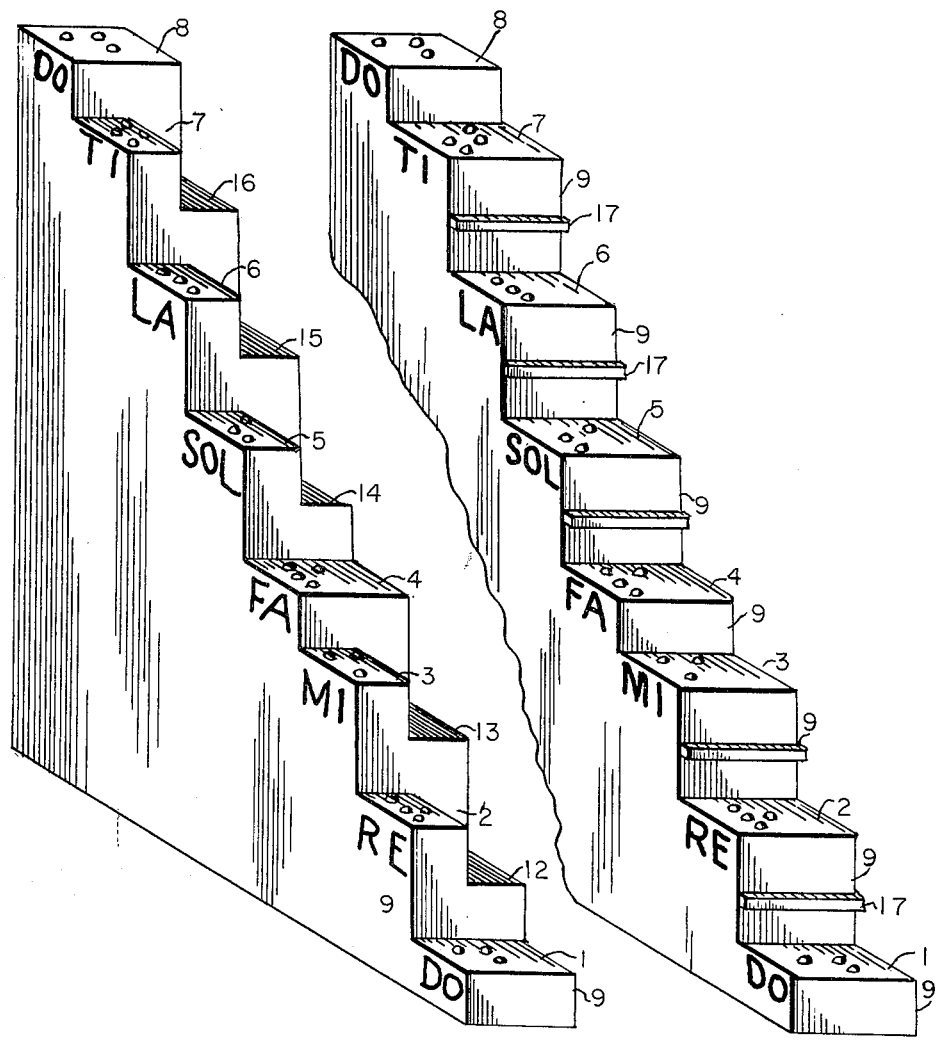
FIGURE 3 is a view in perspective of another embodiment of the invention illustrative of the major and chromatic music scales.
FIGURE 4 is a partial view in perspective of still another embodiment of the invention.

FIGURE 3 illustrates another embodment of the invention in which the half tones or tones occurring between the tones of the major scale that are spaced by full intervals, are represented by notches or steps having risers equal to one half the distance between the whole tones of the major scale. The total tones or notes in the chromatic scale which includes the tones of the major scale and the intermediate tones is thirteen.

As in the embodiment of FIGURE 1, the major scale is represented by the steps 1 to 8 inclusive having risers 9 proportioned to represent the tonal interval between the notes of the scale. This is depicted by the steps of the stairway of FIGURE 3 on the left hand side thereof. On the right hand side of the stairway are provided the additional steps 12 to 16 inclusive. They have risers proportional to the half tones between the whole tones of the major scale in which they are located. For example the step 12 is one half the distance between the steps 1 and 2, the step 13 one half the distance between the steps 2 and 3, the step 14 one half the distance between the steps 4 and 5, the step 15 one half the distance between the steps 5 and 6 and the step 16 one half the distance between the steps 6 and 7. On the printed staff these notes or tones would by represented by sharps and flats appearing adjacent the notes thereon. The steps on the right hand side of the stairway together with the steps on the left hand side of the stairway represent the notes in the chromatic scale.

FIGURE 4 illustrates a modification of the embodiment shown in FIGURE 3, in that the notes or tones of the chromatic scale that are not a part of the major scale are represented by strips 17 affixed to the risers half way between the steps spaced a whole tone interval apart. The strips project from the surface of the risers so that they can be felt.

In each embodiment, the steps of the major scale are identified in braille by the first letter of the word symbol of the tone it is to represent. The steps are further identified by the word symbols being impressed or otherwise affixed to the side of the stairway, so that the stairway may be used in the teaching of the sighted pupil as well as the unsighted. The opposite side of the stairway also has the number of the step impressed thereon (not showing in the drawing) whereby the steps may be referred to by number.

Each of the various embodiments of the invention herein disclosed provide a device, that may be placed in the hands of the pupil to hold and to follow the oral direction of the teacher through his sense of touch. The braille symbols and the printed word symbols positioned on or adjacent each level or step of the stairway identifies the note or tone that the level or step represents. The vertical dimension of the riser through the sense of touch and visual observation indicates to the pupil the extent of the interval between the notes or tones of the scale and the relative position of the notes or tones one to the others provides the melodic direction that is absent in the braille music notation in braille music books.

In the use of the device as a teaching aid, the pupil has one in his hand and can follow with his fingers and through his sense of touch, see the notes, the distance apart, and their direction from one another in a specific way as the sighted pupil sees the notes on the printed staff. The intervals between the notes of the major scale are represented with greater exactness than they are represented on the printed staff. By this device, the loss of the printed staff, the blackboard is made up for by a representation that brings out with greater clarity the exact nature of the musical scale.

While in the present embodiments the stairway is constructed to have an octave length, it is contemplated that the stairways may be made to have a length greater than one octave, and the stairway may be made to start on another note than that represented by "Do" or to depict other scales than the major and chromatic as for example minor scale, whole tone scale, pentatonic scale, quarter-tone scale etc.

The chief use of the "SOLFA STAIRWAY" is in the teaching of the musical scale and as an aid in singing. It has also been found to provide considerable and valuable aid in the teaching of other tonal patterns and relationships in melodies, as for example, the thirds, fourths, fifths, sixths, and sevenths. It has been found that these intervals are easier to present and that the pupils acquire a greater degree of understanding than would otherwise be possible without its use.

While there are above disclosed but a limited number of embodiments of the structure of the invention herein presented, it is possible to produce still other embodiments without departing from the inventive concept herein disclosed, and it is desired therefore that only such limitations be imposed on the appended claim as are stated therein, or required by the prior art.

I claim:

A stairway device for teaching the fundamentals of music to the blind comprising:
  a plurality of steps equal in number to the number of tones in an octave of the major scale;
  braille symbols on the tread of each step to identify each step with a tone of the major scale;
  a plurality of risers separating said steps, said risers being dimensionally proportional in the vertical direction to the tonal intervals occurring between the tones represented by the steps; and
  strips mounted on said risers in a direction parallel to the surface of said steps and spaced between the upper and lower edges of the risers a distance proportional to the intervals occurring between the tones represented by the steps and the tones of the chromatic scale.

References Cited by the Examiner

UNITED STATES PATENTS

| | | | |
|---|---|---|---|
| 675,723 | 6/01 | Forfar | 84—472 |
| 1,796,845 | 3/31 | Jolls | 84—472 |
| 2,371,325 | 3/45 | Wessborg | 35—38 |
| 2,464,146 | 3/49 | Mohler | 35—38 X |

OTHER REFERENCES

Peripole Products, Inc., Catalog "Step Bells," page 9, July 1958 (copy in group 430).

LEO SMILOW, *Primary Examiner.*